US009432690B2

(12) United States Patent
Zheng et al.

(10) Patent No.: US 9,432,690 B2
(45) Date of Patent: Aug. 30, 2016

(54) APPARATUS AND METHOD FOR VIDEO PROCESSING (71) Applicant: ATI Technologies ULC, Markham (CA)

(72) Inventors: Yubao Zheng, Markham (CA); Boris Ivanovic, North York (CA); Allen J. Porter, Sunderland (CA); Xingping Cao, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 797 days.

(21) Appl. No.: 13/754,210

(22) Filed: Jan. 30, 2013

(65) Prior Publication Data
US 2014/0211854 A1    Jul. 31, 2014

(51) Int. Cl.
*H04N 11/02* (2006.01)
*H04N 19/523* (2014.01)
*H04N 19/52* (2014.01)

(52) U.S. Cl.
CPC ............ *H04N 19/523* (2014.11); *H04N 19/52* (2014.11)

(58) Field of Classification Search
CPC .......................... H04N 19/52; H04N 19/523
USPC .................................................... 375/240.16
See application file for complete search history.

(56) References Cited

U.S. PATENT DOCUMENTS

| | | | | |
|---|---|---|---|---|
| 6,292,589 B1 * | 9/2001 | Chow | ................. | H04N 19/197 348/416.1 |
| 2003/0112864 A1 * | 6/2003 | Karczewicz | .......... | G06T 3/4007 375/240.01 |
| 2005/0047502 A1 * | 3/2005 | McGowan | ........... | H04N 9/8042 375/240.01 |
| 2005/0213661 A1 * | 9/2005 | Xiang | ................... | G06T 7/2013 375/240.16 |
| 2006/0262852 A1 * | 11/2006 | Cai | ........................ | H04N 19/51 375/240.16 |
| 2009/0168887 A1 * | 7/2009 | Lin | ........................ | H04N 19/14 375/240.16 |
| 2014/0064369 A1 * | 3/2014 | Laroche | ................ | H04N 19/52 375/240.13 |

* cited by examiner

*Primary Examiner* — Christopher S Kelley
*Assistant Examiner* — Deirdre Beasley
(74) *Attorney, Agent, or Firm* — Volpe and Koenig, P.C.

(57) ABSTRACT

Methods and apparatus for facilitating motion estimation in video processing are provided. In one embodiment, search block is defined within one frame. A relative location of a corresponding block in another frame with respect to the search block is determined based on comparative searching at a predetermined granularity to produce a motion vector for the search block with a first precision. Correlation values are determined with respect to the search block for the corresponding block and for one block or more blocks defined at relative locations of less than the predetermined granularity with respect to the corresponding block in different directions. A refined motion vector for the search block with a second higher precision is determined based on the relative location of the block having a selected correlation value that is selected from among the determined correlation values.

21 Claims, 7 Drawing Sheets

| V04 | V14 | V24 | V34 | V44 | V54 |
|---|---|---|---|---|---|
| V03 | V13 | V23 | V33 | V43 | V53 |
| V02 | V12 | V22 | V32 | V42 | V52 |
| V01 | V11 | V21 | V31 | V41 | V51 |
| V00 | V10 | V20 | V30 | V40 | V50 |

FIG. 5C

| V14 | V24 | V34 | V44 | V54 |
|---|---|---|---|---|
| V13 | V23 | V33 | V43 | V53 |
| V12 | V22 | V32 | V42 | V52 |
| V11 | V21 | V31 | V41 | V51 |
| V10 | V20 | V30 | V40 | V50 |

| V04 | V14 | V24 | V34 | V44 |
|---|---|---|---|---|
| V03 | V13 | V23 | V33 | V43 |
| V02 | V12 | V22 | V32 | V42 |
| V01 | V11 | V21 | V31 | V41 |
| V00 | V10 | V20 | V30 | V40 |

| H05 | H15 | H25 | H35 | H45 |
|-----|-----|-----|-----|-----|
| H04 | H14 | H24 | H34 | H44 |
| H03 | H13 | H23 | H33 | H43 |
| H02 | H12 | H22 | H32 | H42 |
| H01 | H11 | H21 | H31 | H41 |
| H00 | H10 | H20 | H30 | H40 |

FIG. 5F

| H05 | H15 | H25 | H35 | H45 |
|-----|-----|-----|-----|-----|
| H04 | H14 | H24 | H34 | H44 |
| H03 | H13 | H23 | H33 | H43 |
| H02 | H12 | H22 | H32 | H42 |
| H01 | H11 | H21 | H31 | H41 |

| H04 | H14 | H24 | H34 | H44 |
|-----|-----|-----|-----|-----|
| H03 | H13 | H23 | H33 | H43 |
| H02 | H12 | H22 | H32 | H42 |
| H01 | H11 | H21 | H31 | H41 |
| H00 | H10 | H20 | H30 | H40 |

| D05 | D15 | D25 | D35 | D45 | D55 |
|-----|-----|-----|-----|-----|-----|
| D04 | D14 | D24 | D34 | D44 | D54 |
| D03 | D13 | D23 | D33 | D43 | D53 |
| D02 | D12 | D22 | D32 | D42 | D52 |
| D01 | D11 | D21 | D31 | D41 | D51 |
| D00 | D10 | D20 | D30 | D40 | D50 |

FIG. 5K

| D14 | D24 | D34 | D44 | D54 |
|-----|-----|-----|-----|-----|
| D13 | D23 | D33 | D43 | D53 |
| D12 | D22 | D32 | D42 | D52 |
| D11 | D21 | D31 | D41 | D51 |
| D10 | D20 | D30 | D40 | D50 |

APPARATUS AND METHOD FOR VIDEO PROCESSING

FIELD

The present disclosure is generally directed to the processing of video data and, in particular, to facilitating motion estimation in connection with such processing.

BACKGROUND

One widespread method of capturing and/or displaying images is through the use of pixel-based image capture and/or display. As electronic imaging resolution has increased along with the increased demand of "real time" video display, the need for quick and efficient processing of video image data also grows.

The processing of video data is generally well known in the art. Typically, data for video is defined by a series of frame images of an X×Y pixel resolution. To facilitate efficient processing, pixel (pel) data for each frame is customarily handled in groups, or blocks. The size of the blocks can be varied. Typically, larger block sizes are better for noise immunity, but smaller block sizes are better for tracking fine detail and handling rotation.

For various types of video processing, such as video encoding, frame rate conversion, super-resolution, etc., it is desirable to perform motion estimation by finding where blocks of image data (or altered versions thereof) that appear in a first frame are located in a second frame. Conventionally, the image data of a search block located at a particular coordinate location in a first frame is searched for in a second frame within a search area that surrounds the search block's relative frame location, although the entire second frame could be searched.

Figure 1:
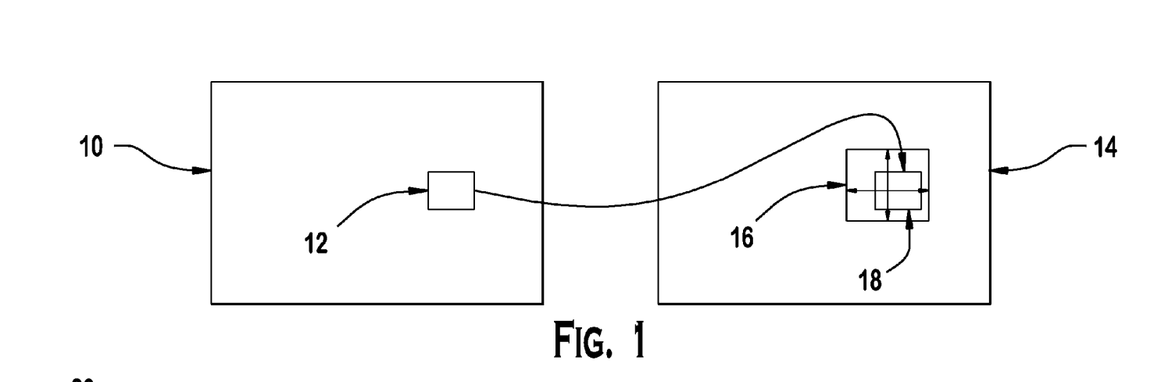
FIG. 1 is a block diagram that illustrates a block search used in a motion estimation determination.

For example, FIG. 1 illustrates a search block 12 at a particular location within a first frame 10. Typically, a search area 16 surrounding the search block's relative frame location in a second frame 14 is analyzed to find a corresponding block 18 that best matches the search block 12. The position of the corresponding block 18 as shown in FIG. 1 is by way of example, the actual location of the "best matching" block may be anywhere within the search area 16. The displacement of the corresponding block 18 from the relative frame location of the search block indicates object movement within the image and a motion vector is defined for the search block 12 based on that displacement.

Block searches for a search block 12 within a search area 16 are typically performed using a pixel based comparison of similarly sized blocks, such as using an accumulation of the sum of the absolute value of differences (SAD) calculation comparison of the pel values of the search block 12 to pel values of respective pels with respect to each similarly sized block within the search area 16. Various other comparison methods are known in the art, such as, for example, the sum squared absolute difference SSAD. However, the SAD metric is widely used due to its relative simplicity and hardware support such as amd_sad( ) extensions in OpenCL.

Once a corresponding block 18 is selected based upon the SAD or other comparison metric calculation, a motion vector is assigned to the search block 12 reflecting the relative frame coordinate displacement between the search block 12 and the corresponding block 18. Where the corresponding block 18 in the second frame 14 is in the same relative location as the search block 12 in the first frame 10, a zero vector will result for that block indicating no relative motion of the portion of an image represented by the pels of the search block 12.

It is common to partition the entire first frame into blocks and to assign a motion vector to each of the blocks using this type of searching process. Such processing is calculation intensive and becomes more calculation intensive and time sensitive as frame and resolution sizes and frame speeds increase.

Searching is commonly performed on a whole pel granularity basis to produce motion vectors with integer-pixel precision. For example, for X×Y sized frames, an M×N subset of an X×Y array of pel data of the first frame 10 can be selected for the search block 12 which is searched for within an I×J search area 16 that is a subset of an X×Y array of pel data of the second frame 18 to produce motion vectors indicating displacement of the search block 12 displaced a whole number of vertical and/or horizontal pixels from a determined corresponding block 18 in the second frame 16.

In some instances, it is desirable to obtain motion vectors having higher than integer precision. To achieve sub-pixel precision motion estimation, the frames may be up-sampled. For example, to achieve half-pixel resolution motion estimation of for X×Y pixel frames, both the first frame and the second frame 10, 14 may be up-sampled in both the X and Y dimensions with a scaling ratio of two to produce pel data arrays that are 2X×2Y in size. To search at a higher granulation an equivalent I×J whole pixel search area 16 within the second frame 16, the higher granulation search is performed by including the half pixel values produced by the up-sampling of a 2I×2J array of pel values within the 2X by 2Y pel value array produced from up-sampling the second frame. Such added complexity can significantly impact performance and/or add to the cost of a processing component by requiring greatly increased bandwidth and/or parallel processing capacity in order to meet timing requirements desired in processing sequential video frames.

SUMMARY OF EXEMPLARY EMBODIMENTS

Methods and apparatus for facilitating motion estimation in video processing are provided. In one embodiment, a search block is defined within a first frame. A relative location of a corresponding block in a second frame with respect to the search block is determined based on comparative searching at a predetermined granularity to produce a motion vector for the search block with a first precision. Correlation values are determined with respect to the search block for the corresponding block and for one or more blocks defined at relative locations of less than the predetermined granularity with respect to the corresponding block in different directions. A refined motion vector for the search block with a second higher precision is determined based on the relative location of the block having a selected correlation value that is selected from among the correlation values with respect to the corresponding block and the other block(s).

Embodiments include determining the relative location of the corresponding block based on comparative searching at whole pixel granularity to produce the motion vector with whole pixel precision. In such case, correlation values are determined for one or more blocks that are located one half pixel vertically, horizontally or diagonally displaced from the corresponding block. A refined motion vector for the search block can then be produced with half pixel precision.

Some embodiments include determining correlation values with respect to two blocks that are each one half pixel vertically displaced from the corresponding block in different directions, two blocks that are each one half pixel horizontally displaced from the corresponding block in different directions and four blocks that are each one half pixel diagonally displaced from the corresponding block in different directions whereby eight respective correlation values are determined for the displaced blocks. A refined motion vector for the search block can then be based on the relative location of the block that has a best correlation value selected from among the eight respective correlation values and the correlation value determined with respect to the corresponding block.

In one embodiment, the search block is defined by an M×N array of pels where the relative location of the corresponding block in the second frame is performed using a sum of the absolute differences (SAD) comparative calculation technique such that the corresponding block is an M×N array of pels within the second frame having a selected SAD correlation value. In such case, a correlation value is determined with respect to blocks that are M×N arrays of pels that are displaced from the corresponding block in different directions using the SAD comparative calculation technique whereby eight respective SAD correlation values are determined for the displaced blocks. However, comparative calculation techniques using metrics other than the SAD metric may be used, such as SSAD.

Embodiments include interpolating pels of the corresponding block to produced pels that define as the displaced blocks, blocks that are M×N arrays of pels displaced one half pixel from the corresponding block in different directions. Alternative embodiments include up-sampling the second frame to produce a 2X×2Y array of pels that alternate between reference pels and oversampled pels where the corresponding block is an M×N array of reference pels and the oversampled pels of the second frame are used to define as the displaced blocks, blocks that are M×N arrays of pels displaced one half pixel from the corresponding block in different directions. The example of one half pixel displacement is not limiting, and other displacements, for example one quarter pixel, may also be implemented.

In one embodiment, a processing component is provided that is configured to perform the disclosed methods which can be advantageously employed in either the encoding or display of video. Accordingly, the processing component can be part of a video capture device, a display device, or a device that both captures and displays video either as a separable or integrated component of such devices. Such a processing component can be implemented as part of an integrated circuit (IC).

In another embodiment, a computer-readable storage medium storing a set of instructions for execution by one or more processors to facilitate manufacture of an integrated circuit that includes a selectively configured processing component. Such a processing component can be configured to define a search block within a first frame and to determine a relative location of a corresponding block in a second frame with respect to the search block based on comparative searching at a predetermined granularity to produce a motion vector for the search block with a first precision and a correlation value with the corresponding block. Such a processing component can be further configured to determine a correlation value with at least one block defined at a relative location of less than the predetermined granularity with respect to the corresponding block and to determine a refined motion vector for the search block with a second higher precision based on the relative location of the block having a selected correlation value that is selected from among the correlation values with respect to the corresponding block and the at least one block. The computer-readable storage medium may contain, for example, instructions that are hardware description language (HDL) instructions used for the manufacture of a device.

DETAILED DESCRIPTION

Video data is generally defined by a series of frame images of an X×Y pixel (pel) resolution. Example resolutions include 800×600 pels and 1920×1080 pels. For various types of video processing, such as video encoding, frame rate conversion, video transcoding, super-resolution, etc., it is desirable to perform motion estimation by finding where blocks of image data (or altered versions thereof) that appear in a first frame are located in a second frame.

Commonly blocks of a first frame that is a current frame are searched for in a second frame that is an immediately preceding frame to determine motion vectors used in processing the first frame for display or other output. However, motion estimation and the methods disclosed herein for a first frame may be performed with respect to preceding or subsequent second frame or frames.

To support improved coding and/or decoding such as, for example, embodiments where real time or faster than real time coding and/or display of video where motion estimation is used, all of the searches for blocks of a reference frame should be fast enough so that video processing can be timely completed. The amount of processing required is generally related to the resolution of the video frames that are being processed.

Those of ordinary skill in the art will recognize how the following examples and embodiments can be adapted to video that contains interspersed images. For example for 3-D effects, a "left" set of X×Y pixels may be provided interspersed with a "right" set of X×Y pixels for each frame. In such case, block searches may be made with respect to the left set and/or right set of pixels. Other types of interspersed pixels can be used and variations of the disclosed examples and methods will by readily apparent to those skilled in the art for such situations.

Figure 2:
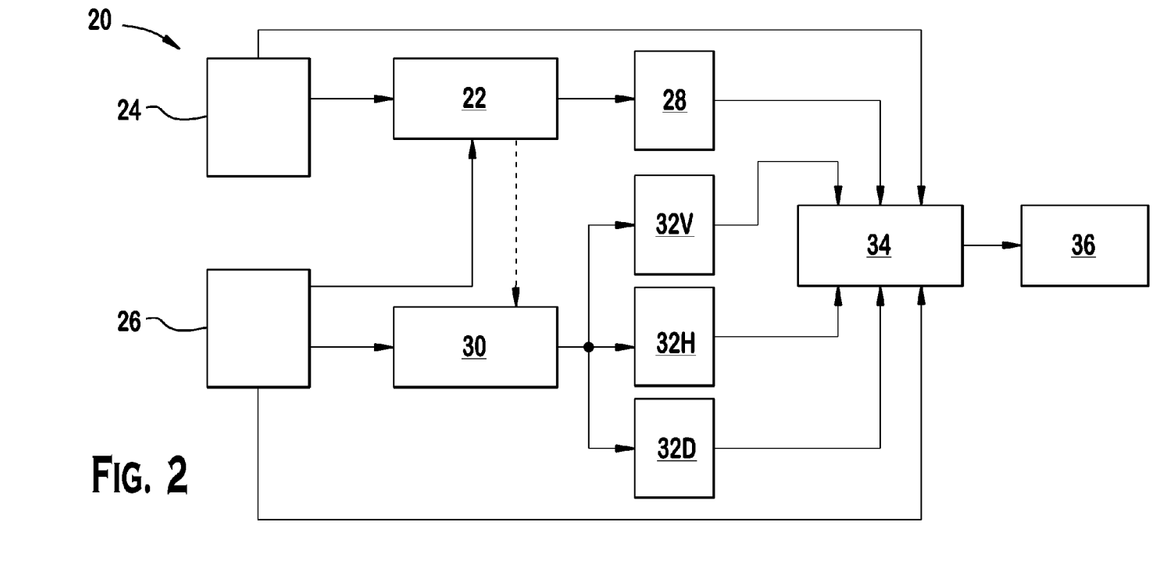
FIG. 2 is a block diagram of an example apparatus for video processing that provides increased motion estimation precision with reduced complexity.

Referring to FIG. 2, an example apparatus 20 for video processing that provides increased motion estimation precision with reduced complexity is illustrated. A motion estimation component 22 is provided that compares pel data of a first frame received from a first input memory component 24 with pel data of a second frame received from a second input memory component 26 to produce motion vectors and correlation values that are output to a third memory component 28. The motion estimation component 22 is configured to define search blocks within the first frame and determine a relative location and a correlation value of respective corresponding blocks in the second frame with respect to each search block. The relative location can be defined in terms of a motion vector of a predefined precision.

The motion estimation component 22 may be configured to perform motion estimation for a search block 12 of a first frame 10 with respect to a predefined search area 16 of a second frame 14 to find a corresponding block 18 within the search area 16 that best matches the search block pels as illustrated in FIG. 1. The position of the corresponding block 18 as shown in FIG. 1 is by way of example, the actual location of the "best matching" block may be anywhere within the search area 16. The displacement of the corresponding block 18 from the relative frame location of the search block indicates image movement and the motion vector is defined for the search block 12 can be produced based on that displacement. The motion estimation component 22 may be configured to partition the entire first frame into blocks and to assign a motion vector to each of the blocks using this type of searching process.

In one embodiment, a sum of absolute differences (SAD) calculation comparative technique is used as a block-matching algorithm to determine the best match between the pels of the search block 12 and the blocks being searched with in the search area 16 in order to identify the corresponding block 18. Other comparison methods may be readily implemented in the motion estimation component 22, but the SAD metric can be readily used as noted above. For example, pel comparison can readily be computed using a SSAD metric or a combination of metrics.

For the illustrated example, once a corresponding block 18 is selected based upon the SAD or other comparison metric calculation, a motion vector is determined for the search block 12 that reflects the relative frame coordinate displacement between the search block 12 and the corresponding block 18. The SAD value or other comparison metric is also saved to the memory component 28 as a correlation value for the corresponding block 18. In this context a correlation value of 0 indicates high correlation or similarity.

Where the corresponding block 18 is in the same relative location as the search block 12, a zero vector will result indicating no relative motion of the portion of an image represented by the pels of the search block 12. Where all of the pels of the search frame 12 exactly match the pels of the corresponding block 18, a calculated SAD correlation value of zero will result.

For the case where the pel data of the first and second frames stored in input memory components 24, 26 is not up-sampled, i.e. based on an X×Y array of pel data for an X×Y frame size, the motion estimation component 22 will search for the corresponding block 18 within the search area 16 with whole pixel granularity to produce motion vectors with whole pixel precision. For example, with respect to a 5-by-5 pel search block 12 located in the first frame 10 at pixel coordinates (x,y) through (x+4, y+4), a 15-by-15 pel search area 16 having pixel coordinates (x−5, y−5) through (x+9,y+9) may be searched to identify the corresponding block 18. In such case, the search may proceed by comparing a 5-by-5 pel blocks of the search area 16 with the 5-by-5 pel search block 12 starting at a block having coordinate (x−5, y−5) for its upper left most pixel for a first comparison. Searching could then proceed with a comparison a next of 5-by-5 pel block of the search area 16 that has coordinate (x−5, y−4) for its upper left most pixel and then with respect to further 5×5 pel blocks horizontally or vertically displaced one pixel from each other.

Where in such case, for example, the corresponding block 18 is determined to be the 5-by-5 pel block of the search area 16 having coordinate (x−2, y+3) for its upper left most pixel, the resultant motion vector would be (−2, +3) representing whole pixel displacement of two whole pixels above and three whole pixels to the right of the relative frame location of the search block 12.

A similarly configured motion estimation component 22 could be employed to search blocks with a finer granularity by processing up-sampled frames of pel data to produced motion vectors with finer precision. For example, half pel precision motion vectors can be obtained by the motion estimation component 22 receiving up-sampled pel data for the first and second X×Y pixel frames so that the searches are conducted with respect to 2X×2Y pel values that include half pel values between both vertically and horizontally adjacent pairs stored in the first and second input memory components 24, 26. Doing this, however, becomes much more costly in terms of complexity, processing time and data storage.

In order to provide finer precision motion vectors for search blocks than produced by motion estimation component 22, the processing apparatus 20 is provided with further components that are configured to determine a correlation value of at least one block defined at a relative location of less than the search granularity used by motion estimation component 22 with respect to the selected corresponding block 18.

As illustrated in the example of FIG. 2, an interpolation component 30 is provided that is configured to provide pel values at one half pixel displacement from the pels of the corresponding block 18 of the second frame 14. In one embodiment, the interpolation component 30 employs a conventional six-tap filter to determine such values that uses weighted averages of pel data from six nearby pixels to create pel data for the one half pixel displaced locations. One skilled in the art will recognize that other interpolation methods may be readily employed for this purpose.

The interpolation component 30 may be configured to receive an identification of the corresponding block 18 from the motion estimation component 22 and to calculate interpolated pel values that are displaced at locations of finer granularity than the corresponding block pels. Alternatively, the interpolation component may be configured to calculate interpolated pel values that are displaced at locations of finer granularity than pels for the entire second frame stored in second input memory 26.

To provide a motion vector with a refined precision than the motion vector produce by motion estimation component 22 with respect to the corresponding block 18, the interpolation component 30 can calculate values for all locations that are one half pixel displaced from the pels of the corresponding block 18 either vertically, horizontally or diagonally. These values can be stored in respective memory components 32V, 32H, 32D for use by a vector refinement component 34.

Figure 3:
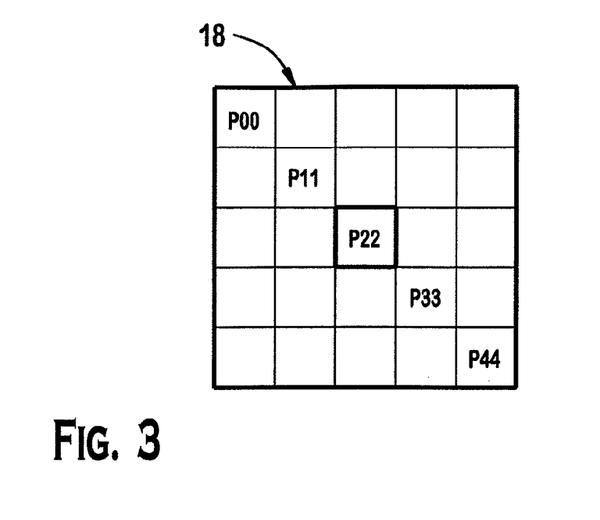
FIG. 3 is an illustration of pixel locations for a corresponding block of pels from which a motion vector was determined.
Figure 4:
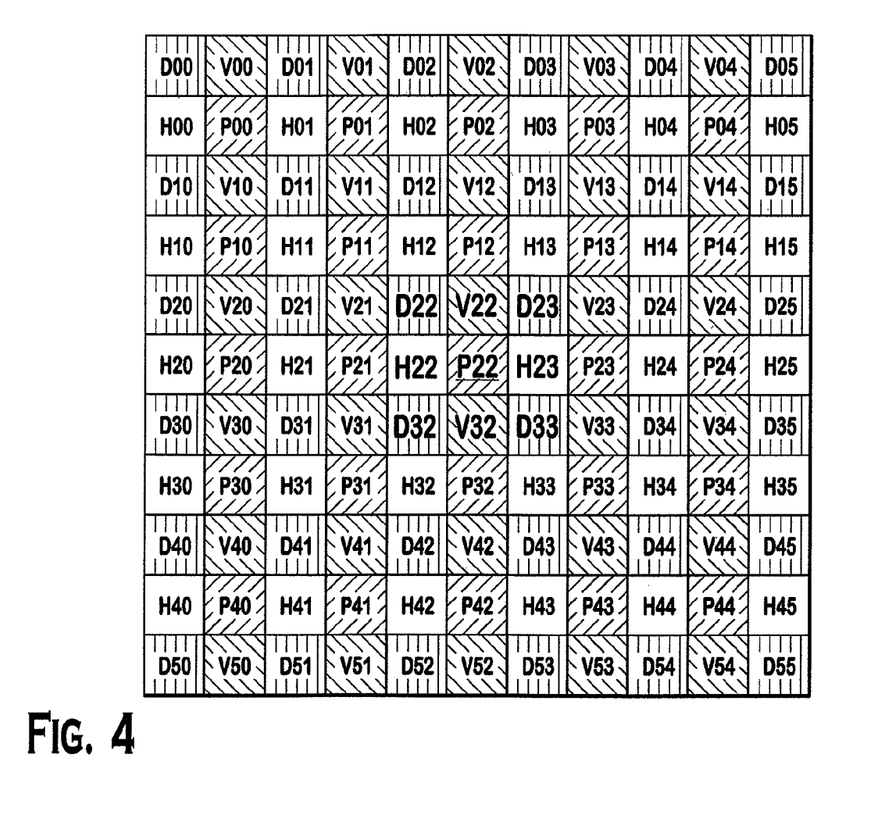
FIG. 4 is an illustration of interpolated pixel locations for the corresponding block of pels shown in FIG. 3.

FIGS. 3 and 4 illustrate an example of one half pixel displaced locations corresponding to pel values produced by the interpolation component 30. With reference to FIG. 3, an example of a 5 by 5 pel corresponding block 18 having pixel locations identified as P00 through P44 is provided. The 5 by 5 pel corresponding block 18 was identified by motion estimation component 22 in determining a motion vector with whole pel precision for a 5 by 5 pel search block 12. To provide a refined motion vector for the search block 12, the interpolation component 30 calculates values for all locations that are one half pixel displaced from the pels P00 through P44 of the corresponding block 18 either vertically, horizontally or diagonally. As illustrated in FIG. 4, the one half pixel displaced pels include vertically displaced pels V00 through V55, horizontally displaced pels H00 through H55 and diagonally displaced pels D00 through D55.

In the example apparatus illustrated in FIG. 2, the interpolation component 30 calculates the respective values for the vertically displaced pels V00 through V55, horizontally displaced pels H00 through H55 and diagonally displaced pels and then saves those values to respective memory components 32V, 32H, 32D.

The vector refinement component 34 can then produce a refined motion vector for search block 12 using the interpolated values. For the example of FIG. 2, the vector refinement component 34 is configured to determine a correlation value with respect to the search block 12 for each of eight respective blocks that are located one half pixel vertically, horizontally or diagonally displaced from the corresponding block 18.

Figure 5A:
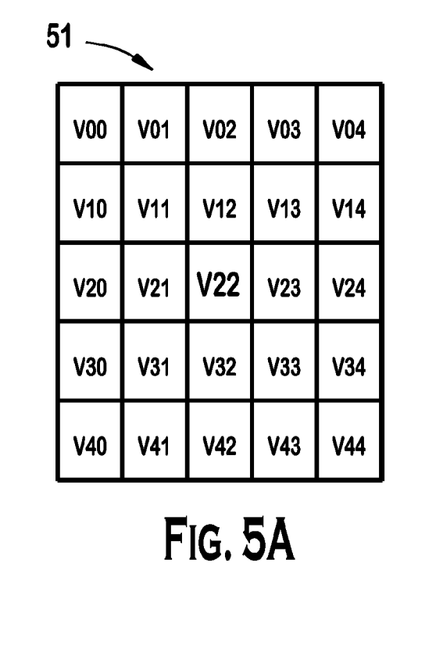
FIGS. 5A-5K are illustrations of pel blocks displaced from the corresponding block of pels shown in FIG. 3 by one half pixel granularity.
Figure 5B:
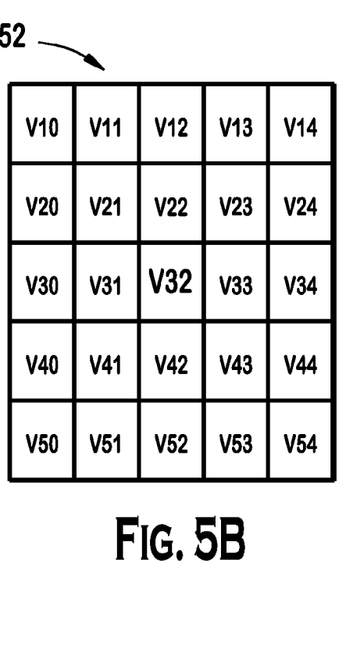
Figure 5C:
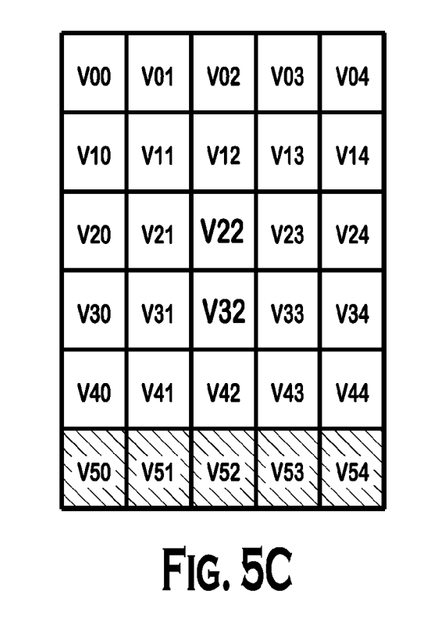
Figure 5D:
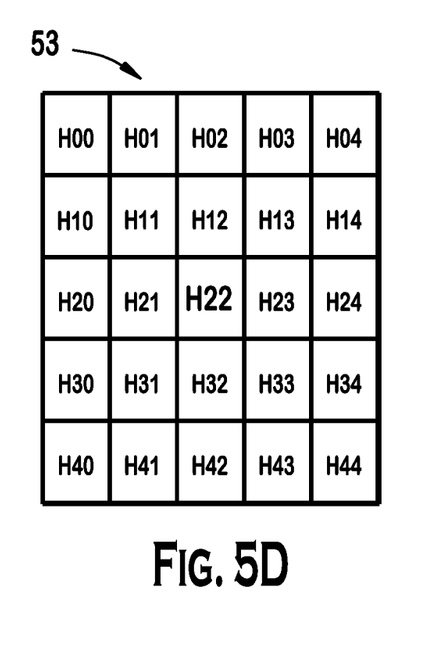
Figure 5E:
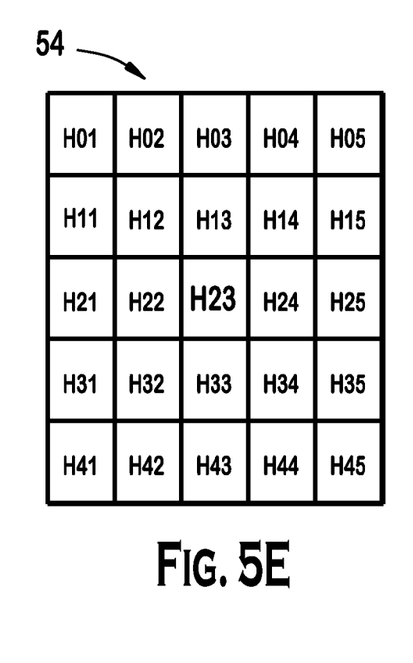

With reference to the corresponding block 18 of FIG. 3 having pixel locations P00 through P44 and the interpolated one half pixel locations illustrated in FIG. 4, the eight respective blocks that are located one half pixel vertically, horizontally or diagonally displaced from the corresponding block 18 are illustrated in FIGS. 5A through 5K. FIG. 5A illustrates the pel values for a block 51 that is one half pixel vertically displaced above the corresponding block 18. FIG. 5B illustrates the pel values for a block 52 that is one half pixel vertically displaced below the corresponding block 18. FIG. 5D illustrates the pel values for a block 53 that is one half pixel horizontally displaced to the left of the corresponding block 18. FIG. 5E illustrates the pel values for a block 54 that is one half pixel horizontally displaced to the right of the corresponding block 18. FIGS. 5G-J illustrate the pel values for blocks 55, 56, 57, 58 that are one half pixel diagonally displaced from the corresponding block 18 in different directions, respectively.

Figure 5F:
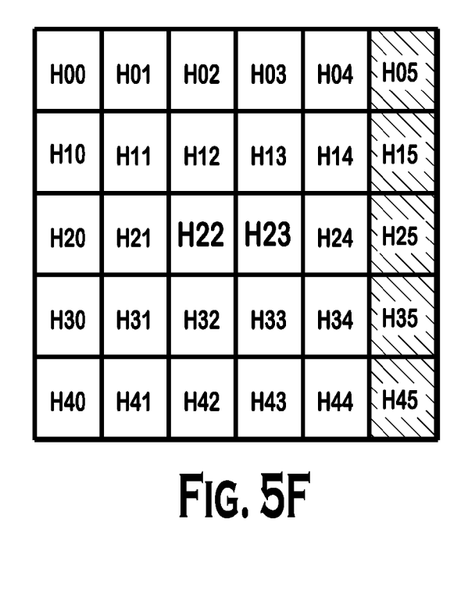
Figure 5G:
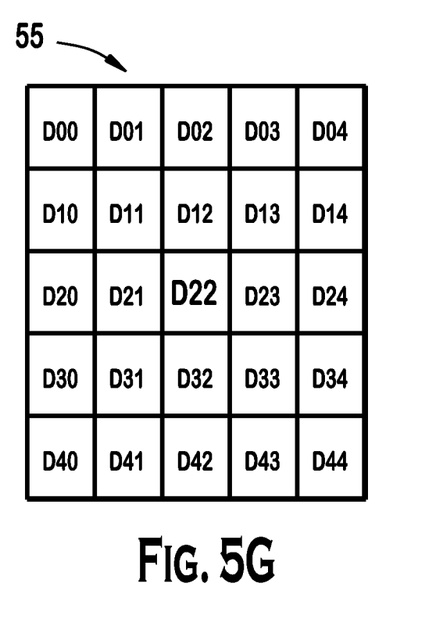
Figure 5H:
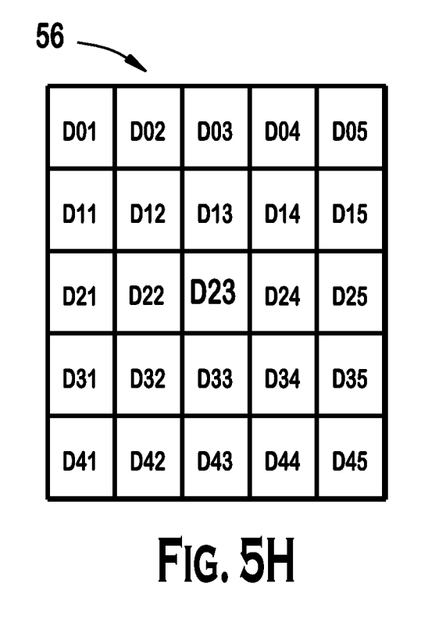
Figure 5I:
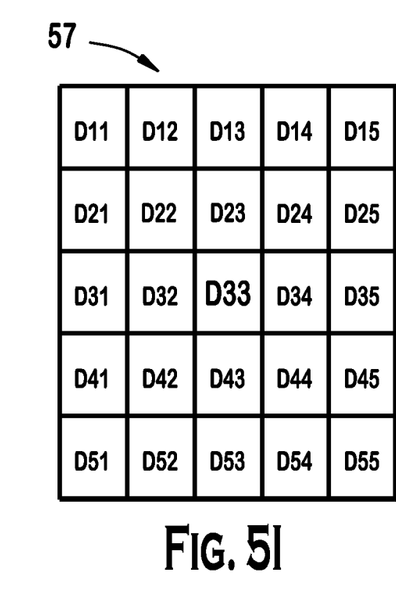
Figure 5J:
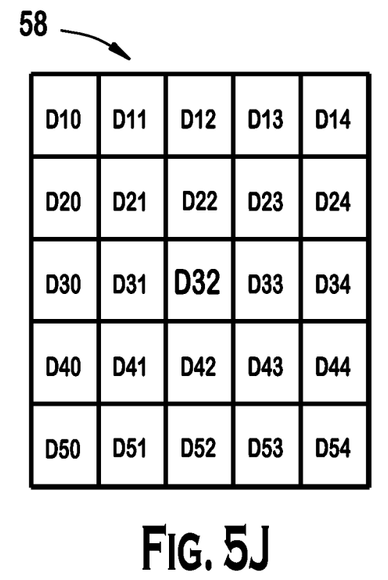
Figure 5K:
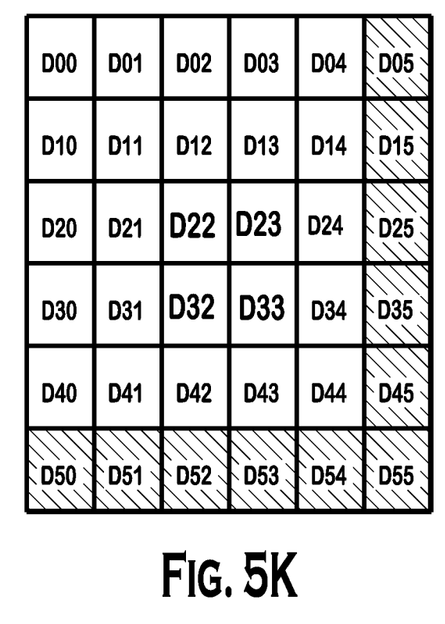

In the above example, blocks 51 and 52 for the vertically displaced half pels are separately identified from the full set of interpolated vertically displaced half pels V00-V054 shown in FIG. 4. Alternatively, the pels for blocks 51 and 52 may be identified in a single search, with the resulting data depicted in FIG. 5C. In this way, the twenty pels that are common to blocks 51 and 52 are not searched for and identified twice, thus reducing data read cycles. A similar approach may be implemented for the horizontally displaced blocks 53 and 54, and the resulting data is shown in FIG. 5F. FIG. 5K illustrates the data identified in a simultaneous search for all of the diagonally displaced half pels in blocks 55-58. The blocks of data shown in FIGS. 5C, 5F, and 5K contain all of the data from blocks 51-58, and may be used by the vector refinement component 34 to identify a refined motion vector.

In one embodiment, the vector refinement component 34 uses the same type of comparison technique used in identifying the corresponding block 18 by the motion estimation component 22, such as the SAD comparative technique to produce respective SAD correlation values for the one half pixel displaced blocks 51-58 of FIGS. 5A-5K. However, a different comparative metric can be used by the vector refinement component 34 than is used by the motion estimation component 22. In which case the pel values for the corresponding block 18 may be retrieved from the second input memory 26 for the calculation of the different metric that is used as the correlation value for purposes of producing the refined motion vector. Where the same metric is used by both the vector refinement component 34 and the motion estimation component 22, the correlation value determined by the motion estimation component 22 in generating the original motion vector can be used by the vector refinement component 34 in determining a refined motion vector.

The vector refinement component 34 compares the correlation values for the corresponding block 18 and the displaced blocks 51-58 and selects the block that has a best correlation value. The vector refinement component 34 uses the location of the selected block to refine the motion vector previously determined by the motion estimation component 22. Once determined, the refined vector can be output to a memory component 36.

In the case of a motion vector (i,j) previously determined by the motion estimation component 22 with whole pixel precision, the vector refinement component 34 making a selection of a block with a correlation value selected from among the correlation values for the corresponding block 18 and the one half pixel displaced blocks 51-58, will produce a refined motion vector within a range of (i±0.5, j±0.5). In such case, where, for example, the vertically above displaced block 51 is selected, the motion vector will be refined to (i−0.05, j). Where, for example, the horizontally right displaced block 54 is selected, the motion vector will be refined to (i, j+0.05). Where, for example, the diagonally displaced block 58 is selected, the motion vector will be refined to (i+0.05, j+0.05). Where, for example, the corresponding block 18 is selected, the refined motion vector will remain as (i, j).

The motion estimation component 22 may be configured to calculate motion vectors at other than whole pixel precision. In such case, one of ordinary skill in the art will recognize that the interpolation component 30 and vector refinement component 34 may be correspondingly configured to provide a refined motion vector with higher precision. For example, if motion estimation component 22 is configured to calculate motion vectors at one half pixel precision by comparative searching with respect to an up-sampled first and second frames at one half pixel granulation, the interpolation component 30 may be configured to produce pel values for one quarter pixel displaced locations and the vector refinement component 34 may be correspondingly configured to provide refined motion vectors with one quarter pixel precision.

Figure 6:
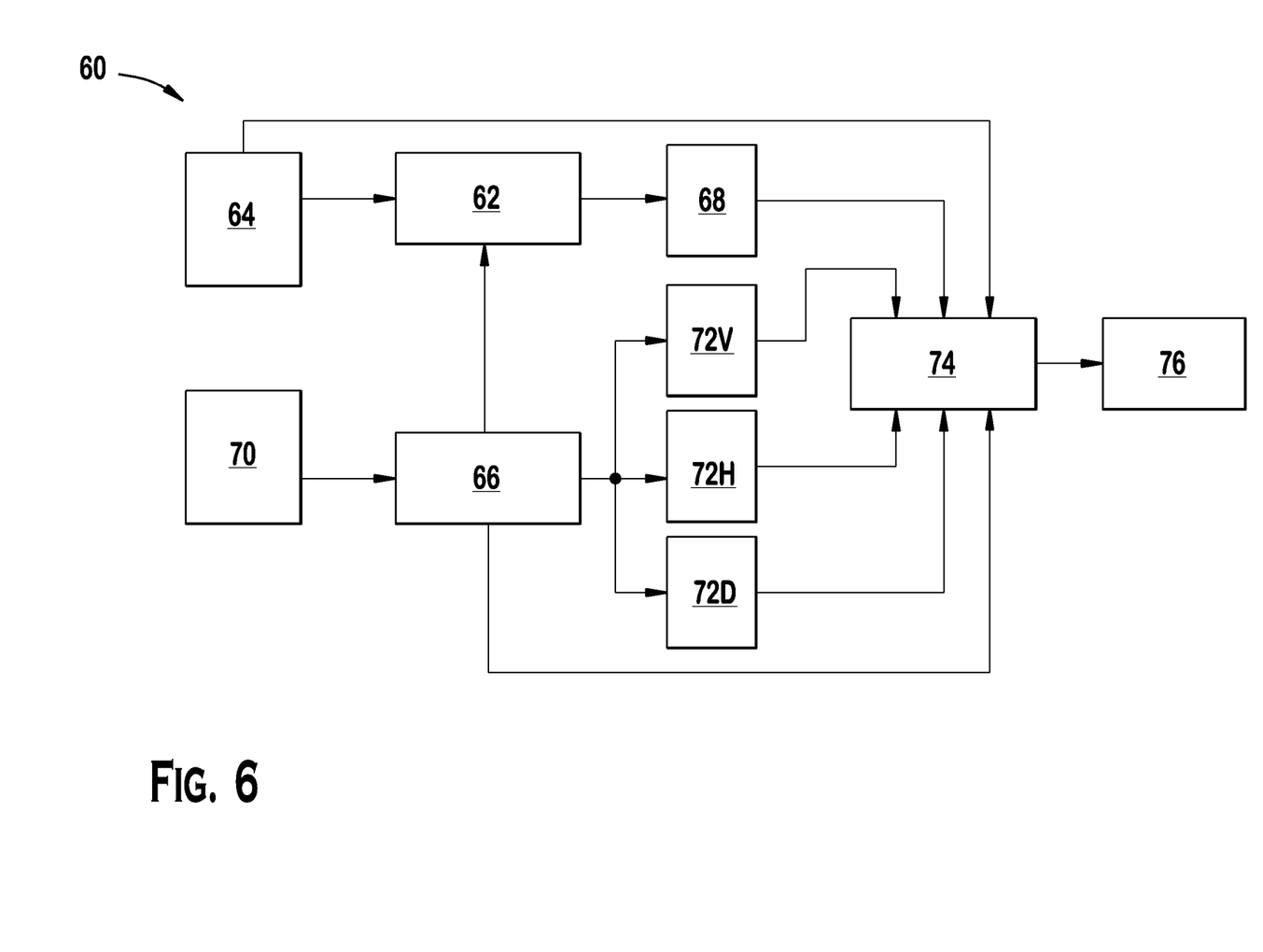
FIG. 6 is a block diagram of another example apparatus for video processing that provides increased motion estimation precision with reduced complexity.

Referring to FIG. 6, another example of an apparatus 60 for video processing that provides increased motion estimation precision with reduced complexity is illustrated. A motion estimation component 62 is provided that compares pel data of a first frame received from a first input memory component 64 with pel data of a reference set of pels of an up-sampled second frame received from a second input memory component 66 to produce motion vectors and correlation values that are output to a third memory component 68.

The apparatus 60 includes an up-sampling device 70 that up-samples pel data of the second frame. For example, for frames that are X×Y in size, the up-sampling of the second frame produces a 2X×2Y array of pels that alternate between reference pels and oversampled pels. The reference set of pels is an X×Y array that reflects the image contained in the second frame.

The motion estimation component 62 is configured to define search blocks within the X×Y sized first frame and determine a relative location and a correlation value of respective corresponding blocks in the reference set of pels of the second frame with respect to each search block in a manner similar to the operation of the motion estimation component 32 of the example apparatus illustrated in FIG. 2. The relative location of 18 can be defined in terms of a motion vector of a whole pixel precision.

To provide a motion vector with a refined precision than the motion vector for a search block produce by the motion estimation component 62 with respect to a corresponding block identified in the reference set of pels of the second frame, the oversampled pels are partitioned into sets that are respectively one half pixel displaced from the reference set of pels vertically, horizontally and diagonally. These values can be stored in respective memory components 72V, 72H, 72D for use by a vector refinement component 74.

The vector refinement component 74 can then produce a refined motion vector for the search block using the oversampled values that are one half pixel displaced from the pels of the corresponding block identified in the reference set of pels of the second frame. The vector refinement component 74 can be configured to determine a correlation value with respect to the search block for each of eight respective blocks that are located one half pixel vertically, horizontally or diagonally displaced from the pels of the corresponding block identified in the reference set of pels of the second frame.

In one embodiment, the vector refinement component 74 uses the same type of comparison technique used in identifying the corresponding block by the motion estimation component 62, such as the SAD comparative technique to produce respective SAD correlation values for the one half pixel displaced blocks. However, a different comparative metric can be used by the vector refinement component 74 than is used by the motion estimation component 62. In which case the pel values for the corresponding block may be retrieved from the second input memory 66 for the calculation of the different metric that is used as the correlation value for purposes of producing the refined motion vector. Where the same metric is used by both the vector refinement component 74 and the motion estimation component 62, the correlation value determined by the motion estimation component 62 in generating the original motion vector can be used by the vector refinement component 74 in determining a refined motion vector.

The vector refinement component 74 compares the correlation values for the corresponding block and the displaced blocks and selects the block that has a best correlation value. The vector refinement component 74 uses the location of the selected block to refine the motion vector previously determined by the motion estimation component 62. Once determined, the refined vector can be output to a memory component 76.

The above described methods and apparatus can be employed as an integral part of a system that either captures or displays video to more efficiently conduct video motion estimation processing in connection with video encoding, frame rate conversion, super-resolution, etc. Such systems include video recorders, camcorders, video cameras and other types of video capture devices, personal computers and other types of devices that display video, computer displays, televisions and other types of display devices. In particular, the above described methods and apparatus can be integrally incorporated and/or employed where such devices use high speed capture and/or high speed display of high resolution video.

Although features and elements are described above in particular combinations, each feature or element can be used alone without the other features and elements or in various combinations with or without other features and elements. The apparatus described herein may be manufactured by using a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks and digital versatile disks (DVDs).

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data, e.g., netlists, GDS data, or the like, that may be used to perform a manufacturing process implemented in a semiconductor fabrication facility. The manufacturing process may be adapted to manufacture semiconductor devices (e.g., processors) that embody various aspects of the present invention.

Suitable processors include, by way of example, a general purpose processor, a special purpose processor, a conventional processor, a digital signal processor (DSP), a plurality of microprocessors, a graphics processing unit (GPU), a DSP core, a controller, a microcontroller, application specific integrated circuits (ASICs), field programmable gate arrays (FPGAs), any other type of integrated circuit (IC), and/or a state machine, or combinations thereof.

What is claimed is:
1. A method of video processing comprising:
   determining, for a search block within a first frame, a relative location of a corresponding block in a second frame with respect to the search block based on comparative searching at a predetermined granularity to produce a motion vector for the search block with a first precision;
   determining correlation values with respect to the search block for the corresponding block and for at least one block defined at a relative location of less than the predetermined granularity with respect to the corresponding block; and
   determining a refined motion vector for the search block with a second higher precision based on the relative location of the block having a selected correlation value that is selected from among the correlation values with respect to the corresponding block and the at least one block,
   wherein the at least one block is produced by up-sampling the corresponding block at less than the predetermined granularity in different directions relative to the corresponding block to generate an alternating pattern of corresponding block pixels and oversampled pixels.
2. The method of claim 1 wherein:
   the determining the relative location of the corresponding block is based on comparative searching at whole pixel granularity to produce the motion vector with whole pixel precision;
   the determining correlation values is performed for the corresponding block and for at least one block that is located one half pixel vertically, horizontally or diagonally displaced from the corresponding block; and the determining a refined motion vector for the search block with a second higher precision is performed to produce the refined motion vector with half pixel precision.

3. The method of claim 2 wherein the determining correlation values is performed for the corresponding block and for a plurality of blocks that are each one half pixel displaced from the corresponding block in different directions.

4. The method of claim 2 wherein:
the determining correlation values is performed for the corresponding block and for two blocks that are each one half pixel vertically displaced from the corresponding block in different directions, two blocks that are each one half pixel horizontally displaced from the corresponding block in different directions and four blocks that are each one half pixel diagonally displaced from the corresponding block in different directions whereby eight respective correlation values are determined for the displaced blocks; and
the determining a refined motion vector for the search block with a second higher precision is based on the relative location of the block that has a best correlation value selected from among the eight respective correlation values for the displaced blocks and the correlation value determined with respect to the corresponding block.

5. The method of claim 4 where the search block is defined by an M×N array of pels wherein:
the determining a relative location of a corresponding block in a second frame is performed using a sum of the absolute differences (SAD) comparative calculation technique such that the corresponding block is an M×N array of pels within the second frame; and
the determining correlation values is performed for the corresponding block and for blocks that are M×N arrays of pels that are displaced one half pixel from the corresponding block in different directions using the SAID comparative calculation technique whereby SAID correlation values are determined.

6. The method of claim 5 where the first frame is defined by an X×Y array of pels that contains the M×N array of pels of the search frame and the second frame is defined by an X×Y array of pels that contains the M×N array of pels of the corresponding frame further comprising:
interpolating pels of the corresponding block to produced pels that define as the displaced blocks, blocks that are M×N arrays of pels displaced one half pixel from the corresponding block in different directions.

7. The method of claim 5 where the first frame is defined by an X×Y array of pels that contains the M×N array of pels of the search frame and the second frame is defined by an X×Y array of pels that contains the M×N array of pels of the corresponding frame, further comprising:
up-sampling the second frame to produce a 2X×2Y array of pels that alternate between reference pels and oversampled pels whereby the corresponding block is an M×N array of reference pels; and
using the oversampled pels of the second frame to define as the displaced blocks, blocks that are M×N arrays of pels displaced one half pixel from the corresponding block in different directions.

8. The method of claim 2 where the search block is defined by an M×N array of pels wherein:
the determining a relative location of a corresponding block in a second frame is performed using a sum of the absolute differences (SAD) comparative calculation technique such that the corresponding block is an M×N array of pels within the second frame; and
the determining correlation values for the corresponding block and for at least one block defined at a location of less than the predefined granularity with respect to the corresponding block is performed using the SAID comparative calculation technique with respect to one or more blocks that are M×N arrays of pels that are displaced one half pixel from the corresponding block.

9. The method of claim 1 where the search block is defined by an M×N array of pels wherein:
the determining a relative location of a corresponding block in a second frame is performed using a sum of the absolute differences (SAD) comparative calculation technique such that the corresponding block is an M×N array of pels within the second frame; and
the determining correlation values is performed for the corresponding block and for at least one block defined at a location of less than the predefined granularity with respect to the corresponding block is performed using the SAID comparative calculation technique with respect to one or more blocks that are M×N arrays of pels that are displaced one half pixel from the corresponding block.

10. An apparatus for video processing comprising:
a processing component configured to:
determine, for a search block within a first frame, a relative location of a corresponding block in a second frame with respect to the search block based on comparative searching at a predetermined granularity to produce a motion vector for the search block with a first precision;
determine correlation values with respect to the search block for the corresponding block and for at least one block defined at a relative location of less than the predetermined granularity with respect to the corresponding block; and
determine a refined motion vector for the search block with a second higher precision based on the relative location of the block having a selected correlation value that is selected from among the correlation values with respect to the corresponding block and the at least one block,
wherein the at least one block is produced by up-sampling the corresponding block at less than the predetermined granularity in different directions relative to the corresponding block to generate an alternating pattern of corresponding block pixels and oversampled pixels.

11. The video processing apparatus of claim 10 wherein the processing component is configured to:
determine the relative location of the corresponding block based on comparative searching at whole pixel granularity to produce the motion vector with whole pixel precision;
determine correlation values for the corresponding block and for at least one block that is located one half pixel vertically, horizontally or diagonally displaced from the corresponding block; and
determine the refined motion vector for the search block with half pixel precision.

12. The video processing apparatus of claim 11 wherein the processing component is configured to determine correlation values with respect to a plurality of blocks that are each one half pixel displaced from the corresponding block in different directions and to determine the refined motion vector based on the relative location of the block having a selected correlation value that is selected from among the correlation values with respect to the corresponding block and the plurality of blocks.

13. The video processing apparatus of claim 11 wherein the processing component is configured to:

determine correlation values of two blocks that are each one half pixel vertically displaced from the corresponding block in different directions, two blocks that are each one half pixel horizontally displaced from the corresponding block in different directions and four blocks that are each one half pixel diagonally displaced from the corresponding block in different directions whereby eight respective correlation values are determined for the displaced blocks; and determine the refined motion vector based on the relative location of the block having a selected correlation value that is selected from among the correlation values with respect to the corresponding block and the displaced blocks.

14. The video processing apparatus of claim 13 where the search block is defined by an M×N array of pels wherein the processing component is configured to:

determine the relative location of the corresponding block using a sum of the absolute differences (SAD) comparative calculation technique such that the corresponding block is an M×N array of pels within the second frame having a selected SAID correlation value; and determine correlation values where the displaced blocks are M×N arrays of pels that are displaced one half pixel from the corresponding block in different directions using the SAID comparative calculation technique whereby eight respective SAID correlation values are determined for the displaced blocks.

15. The video processing apparatus of claim 14 where the first frame is defined by an X×Y array of pels that contains the M×N array of pels of the search frame and the second frame is defined by an X×Y array of pels that contains the M×N array of pels of the corresponding wherein the processing component is configured to:

interpolate pels of the corresponding block to produced pels that define the displaced blocks as blocks that are M×N arrays of pels displaced one half pixel from the corresponding block in different directions.

16. The video processing apparatus of claim 14 where the first frame is defined by an X×Y array of pels that contains the M×N array of pels of the search frame and the second frame is defined by an X×Y array of pels that contains the M×N array of pels of the corresponding frame, wherein the processing component is configured to:

up-sample the second frame to produce a 2X×2Y array of pels that alternate between reference pels and oversampled pels whereby the corresponding block is an M×N array of reference pels; and use the oversampled pels of the second frame to define the displaced blocks as blocks that are M×N arrays of pels displaced one half pixel from the corresponding block in different directions.

17. The video processing apparatus of claim 11 where the search block is defined by an M×N array of pels wherein the processing component is configured to:

determine the relative location of the corresponding block using a sum of the absolute differences (SAD) comparative calculation technique such that the corresponding block is an M×N array of pels within the second frame; and determine correlation values using the SAID comparative calculation technique for the corresponding block and for one or more blocks that are M×N arrays of pels that are displaced one half pixel from the corresponding block.

18. The video processing apparatus of claim 10 where the search block is defined by an M×N array of pels wherein the processing component is configured to:

determine the relative location of the corresponding block using a sum of the absolute differences (SAD) comparative calculation technique such that the corresponding block is an M×N array of pels within the second frame; and determine the correlation value using the SAID comparative calculation technique the corresponding block and for one or more blocks that are M×N arrays of pels that are displaced one half pixel from the corresponding block.

19. The apparatus of claim 10 implemented in an integrated circuit (IC).

20. A non-transitory computer-readable storage medium storing a set of instructions for execution by one or more processors to facilitate manufacture of an integrated circuit that includes:

a processing component configured to:

determine, for a search block within a first frame, a relative location of a corresponding block in a second frame with respect to the search block based on comparative searching at a predetermined granularity to produce a motion vector for the search block with a first precision;

determine correlation values with respect to the search block for the corresponding block and for at least one block defined at a relative location of less than the predetermined granularity with respect to the corresponding block; and determine a refined motion vector for the search block with a second higher precision based on the relative location of the block having a selected correlation value that is selected from among the correlation values with respect to the corresponding block and the at least one block, wherein the at least one block is produced by up-sampling the corresponding block at less than the predetermined granularity in different directions relative to the corresponding block to generate an alternating Pattern of corresponding block pixels and oversampled pixels.

21. The non-transitory computer-readable storage medium of claim 20 wherein the instructions are hardware description language (HDL) instructions used for the manufacture of a device.

* * * * *